US006206364B1

(12) United States Patent
Brinkman et al.

(10) Patent No.: US 6,206,364 B1
(45) Date of Patent: Mar. 27, 2001

(54) PAPER TRANSPORT BELT OF ALKYLATED CHLOROSULFONATED POLYETHYLENE

(75) Inventors: Paul Norman Brinkman; Thomas George Burrowes, both of Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/251,916

(22) Filed: Feb. 17, 1999

(51) Int. Cl.[7] ............................ B41L 21/00; C08L 23/34; C08K 3/04

(52) U.S. Cl. .......................... 271/193; 271/208; 524/576; 524/585; 525/333.9; 525/334.1

(58) Field of Search ............................... 271/193, 7, 208; 197/845; 399/361, 384, 397; 524/576, 585; 525/333.9, 334.1

(56) References Cited

U.S. PATENT DOCUMENTS

| | | | | |
|---|---|---|---|---|
| 4,314,006 | | 2/1982 | Lentz et al. | 428/494 |
| 4,823,942 | * | 4/1989 | Martin et al. | 198/847 |
| 5,308,725 | | 5/1994 | Yu et al. | 430/56 |
| 5,378,206 | | 1/1995 | Mizuno et al. | 474/263 |
| 5,408,007 | * | 4/1995 | Mizuno et al. | 525/305 |
| 5,610,217 | | 3/1997 | Yarnell et al. | 524/397 |
| 5,711,734 | | 1/1998 | Shioyama et al. | 474/260 |
| 5,790,933 | | 8/1998 | Williams | 399/393 |
| 5,839,045 | | 11/1998 | Wierszewski | 399/382 |

* cited by examiner

*Primary Examiner*—David W. Wu
*Assistant Examiner*—Kelechi C. Egwim
(74) *Attorney, Agent, or Firm*—Bruce J Hendricks

(57) ABSTRACT

A paper transport belt and a paper handling apparatus containing a paper transport belt which is made from a composition containing an alkylated chlorosulfonated polyethylene polymer.

12 Claims, 1 Drawing Sheet

PAPER TRANSPORT BELT OF ALKYLATED CHLOROSULFONATED POLYETHYLENE

SUMMARY OF THE INVENTION

The present invention relates to a paper transport belt and a paper handling apparatus containing a paper transport belt which is made from a composition containing an alkylated chlorosulfonated polyethylene polymer.

In the past, paper transport belts have been produced from EPDM compositions and chlorosulfonated polyethylene (CSM) compositions. The EPDM containing belts are characterized by better tension decay properties than the chlorosulfonated polyethylene containing belts. Unfortunately, the EPDM containing belts have a greater tendency to mark paper. The EPDM can be made progressively more no-marking by reducing the level of carbon black. However, there is a minimal level of conductive carbon black needed to achieve required static conductivity properties. Unfortunately, use of EPDM will still mark paper with this minimum carbon black level. In applications where non-marking properties are critical, CSM is used in the belt composition. CSM will retain its non-marking characteristics at much higher carbon black levels. However, tension decay properties and, therefore, service life is sacrificed as a result. Therefore, there exists the need for a paper transport belt which is made from a material that exhibits excellent tension decay properties with concomitant desirable non-marking properties and static-conductivity properties.

DETAILED DESCRIPTION OF THE INVENTION

Figure 1:
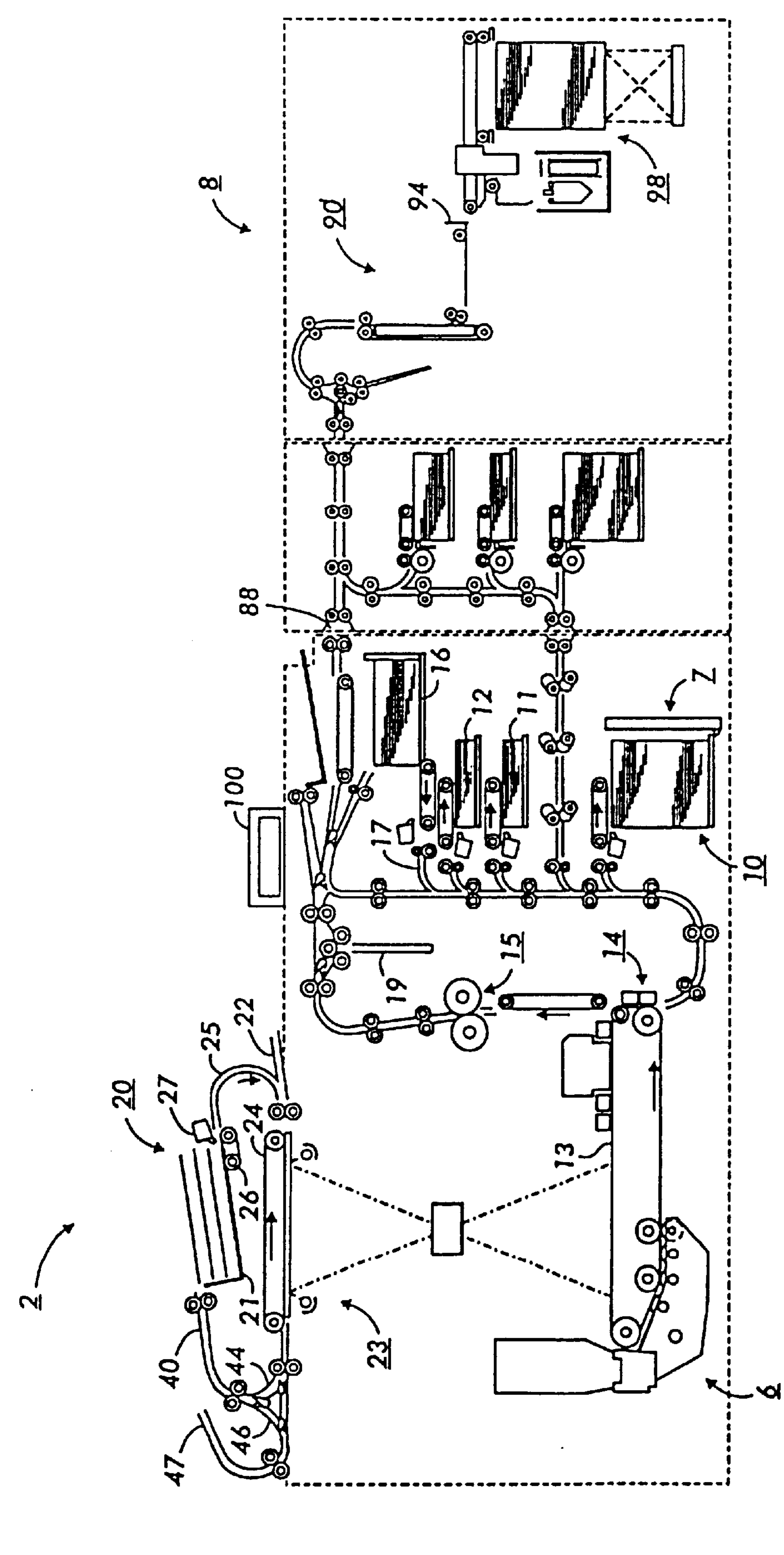
FIG. 1 is a schematic view illustrating the principal mechanical components and paper path of a paper handling apparatus of the present invention.

There is disclosed a paper handling apparatus for moving paper within a document handling machine, having a flexible paper transport belt, the improvement which comprises making said transport belt from a composition which contains an alkylated chlorosulfonated polyethylene polymer. In the specific embodiment shown in FIG. 1, a copying machine is illustrated. However, it is contemplated that the paper handling transport belt may be used with paper handling machines other than copiers.

In addition, there is disclosed a transport belt, for use in a paper handling apparatus, the improvement which comprises making said transport belt from a composition which contains an alkylated chlorosulfonated polyethylene polymer.

In FIG. 1, there is shown, in schematic form, an exemplary paper handling apparatus 2 for processing, printing and finishing print jobs. For purposes of explanation, the paper handling apparatus 2 is divided into a xerographic processing or printing section 6, a sheet feeding section 7 and a finishing section 8. As described later, the paper transport belts of the present invention have particular use in the printing section 6 (recirculating handler 20) and document sheet feeding section 7. With the exception of implementation of the unique paper transport belt of the invention, the apparatus of FIG. 1 is illustrated and described in detail in U.S. Pat. No. 5,839,045, the principal operation of which may also be disclosed in various other xerographic or other printing machines.

A printing system of the type shown herein is preferably adapted to provide, in a known manner, duplex or simplex collated print sets from either duplex or simplex original documents circulated by a document handler. As is conventionally practiced, the entire document handler unit 20 may be pivotally mounted to the copier so as to be liftable by an operator for alternative manual document placement and copying. In this manner, the exemplary printing system or apparatus 2 is designed to receive input documents as manually positioned on an optically transparent platen or automatically positioned thereon via a document handler, such as a recirculating document handler (RDH) 20, via a document handler input tray 21 or a document feeder 22.

The RDH 20 operates to automatically transport individual registered and spaced document sheets into an imaging station 23, platen operatively associated with the xerographic processing section 6. A platen transport system 24 is also provided, which may be incrementally driven via a non-slip or vacuum belt system controlled by a system controller 100 for stopping the document at a desired registration (copying) position in a manner taught by various references known in the art.

The RDH 20 has a conventional "racetrack" document loop path configuration, which preferably includes generally known inverting and non-inverting return recirculation paths for transporting original input documents back to the RDH loading and restacking tray 21. An exemplary set of duplex document sheets is shown stacked in this document tray 21. For clarity, the illustrated document and copy sheets are drawn here with exaggerated spacing between the sheets being stacked; in actual operation, these stacked sheets would be directly superposed upon one another. The RDH 20 may be a conventional dual input document handler, having an alternative semiautomatic document handling (SADH) side-loading slot 22. Documents may be fed to the same imaging station 23 and transported by the same platen transport system or belt 24 from either the SADH input 22 at one side of the RDH 20, or from the regular RDH input; namely, the loading or stacking tray 21, situated on top of the RDH unit. While the side-loading slot 22 is referred to herein as the SADII feeding input 22, this input feeder is not limited to semi-automatic or "stream feed" document input feeding but is also known to be usable for special "job interrupt" insert jobs. Normal RDH document feeding input comes from the bottom of the stack in tray 21 through arcuate, inverting RDH input path 25 to the upstream end of the platen transport 24. Input path 25 preferably includes a "stack bottom" corrugated feeder-separator belt 26 and air knife 27 system, including document position sensors (not shown) and a set of turn baffles and feed rollers for inverting the incoming original documents prior to imaging. The paper transport belt of the present invention may be used as the corrugated feeder-separator belt 26 shown in FIG. 1.

Document inverting or non-inverting by the RDH 20 is further described, for example, in U.S. Pat. No. 4,794,429 or 4,731,637, among others. Briefly, input documents are typically exposed to a light source on the platen imaging station 23, or fed across the platen without being exposed, after which the documents may be ejected by the platen transport system 24 into downstream or off-platen rollers and further transported past a gate or a series of gates and sensors. Depending on the position of these gates, the documents are either guided directly to a document output path and then to a catch tray, or, more commonly, the documents are deflected past an additional sensor, and into an RDH return path 40. The RDH return path 40 provides a path for leading the documents back to tray 21 so that a document set can be continually recirculated. This RDH return path 40 includes reversible rollers to provide a choice of two different return paths to the RDH tray 21: a simplex return path 44 which provides sheet or document inversion or a reversible duplex return path 46 which provides no inversion. For the duplex path 46, the reversible roller are reversed to reverse feed the previous trail edge of the sheet back into the duplex return path 46 from an inverter chute 47. This duplex return path 46 provides for the desired inversion of duplex documents in one circulation as they are returned to the tray 21, for copying opposite sides of these documents in a subsequent circulation or circulations. Typically, the RDH inverter and inversion path 46, 47 are used only for documents loaded in the RDH input tray 21 and for duplex documents. In normal operation, a duplex document has only one inversion per circulation (occurring in the RDH input path 25). By contrast, in the simplex circulation path, there are two inversions per circulation, one in each of the paths 25 and 44, whereby two inversions per circulation is equivalent to no inversion such that simplex documents are returned to tray 21 in their original (face up) orientation via the simplex path 44.

The entire stack of originals in the RDH tray 21 can be recirculated and copied to produce a plurality of collated copy sets. In addition, the document set or stack may be recirculated through the RDH any number of times in order to produce any desired number of collated duplex print sets, that is, collated sets of duplex copy sheets, in accordance with various instruction sets known as print jobs which can be programmed into a controller 100, to operator which will be described.

Since the copy or print operation and apparatus of the present invention is well known and taught in numerous patents and other published art, the system will not be described in detail herein. Briefly, blank or preprinted copy sheets are conventionally provided by sheet feeder section 7, whereby sheets are delivered by the belts of the present invention from a high capacity feeder tray 10 or from auxiliary paper trays 11 or 12 for receiving a copier document image from photoreceptor 13 at transfer station 14. It is the flexible paper transport belts in the sheet feeder section 7 that is particularly suited for use of the ACSM rubber composition described herein. In addition, copy sheets may be provided in an independent or stand-alone device coupled to the electrophotographic printing system 2. After a developed image is transferred to a copy sheet, an output copy sheet is delivered to a fuser 15, and further transported to finishing section 8 (if they are to be simplex copies), or, temporarily delivered to and stacked in a duplex buffer tray 16 if they are to be duplexed, for subsequent return (inverted) via path 17 for receiving a second side developed image in the same manner as the first side. This duplex tray 16 has finite predetermined sheet capacity, depending on the particular copier design. The completed duplex copy is preferably transported to finishing section 8 via output path 88. An optionally operated copy path sheet inverter 19 is also provided.

Output path 88 is directly connected in a conventional manner to a bin sorter 90 as is generally known and as is disclosed in U.S. Pat. No. 3,467,371 incorporated in its entirety by reference herein. Bin sorter 90 includes a vertical bin array 94 which is conventionally gated (not shown) to deflect a selected sheet into a selected bin as the sheet is transported past the bin entrance. An optional gated overflow top stacking or purge tray may also be provided for each bin set. The vertical bin array 94 may also be bypassed by actuation of a gate for directing sheets serially onward to a subsequent finishing station. The resulting sets of prints are then discharged to finisher 8 which may include a stitcher mechanism for stapling print sets together and/or a thermal binder system for adhesively binding the print sets into books. A stacker 98 is also provided for receiving and delivering final print sets to an operator or to an external third party device.

All document handler, xerographic imaging sheet feeding and finishing operations are preferably controlled by a generally conventional programmable controller 100. The controller 100 is additionally programmed with certain novel functions and graphic user interface features for the general operation of the apparatus 2 and the dual path paper feeder.

With respect to the paper transport belt of the present invention, its compositional makeup will now be described in greater detail. The composition is made up from an alkylated chlorosulfonated polyethylene rubber.

The alkylated chlorosulfonated polyethylene rubber (ACSM) is produced from a low density, straight-chain polyethylene that is chlorosulfonated so that its chlorine content is within the range of 15 to 45 weight percent (wt %) and sulfur content is within the range of 0.5 to 2.5 weight percent. The Mooney Viscosities, ML (1+4)@ 100° C., may range from 30 to 92. Since the ACSM includes an alkyl side chain, the crystallinity of the polyethylene of the main chain is lowered and the ACSM hence has rubber-like properties. Commercially available ACSM include those rubbers sold by Du Pont de Nemours, E. I., and Company under the designation ACSIUM® and the grades 6367S, 6367, 6932 and 6983. Grade 6367S has a chlorine content of 27 percent and a Mooney Viscosity of 34. Grade 6367 has a chlorine content of 27 percent and a Mooney Viscosity of 43. Grade 6932 has a chlorine content of 30 percent and a Mooney Viscosity of 50. Grade 6983 has a chlorine content of 26.5 percent and a Mooney Viscosity of 88. The preferred ACSM is Grade 6367 which has a chlorine content of 27 percent and a Mooney Viscosity of 43.

The ACSM rubber composition may be blended with up to 50 percent by weight, based on the total weight of rubber content in the composition, of a second rubber. The second rubber may be added in an amount ranging from 0 percent by weight up to 50 percent by weight. Preferably, the level of a second rubber ranges from 0 to 40 percent by weight.

Representative examples of such second rubbers include ethylene-alpha-olefin elastomers, chlorosulfonated polyethylene, ethylene vinyl acetate, trans polyoctenamer and mixtures thereof. Representative examples of ethylene-alpha-olefin elastomeric include ethylene propylene copolymers, ethylene octene copolymers, ethylene propylene diene copolymers and mixtures thereof.

An essential component of the ACSM composition is conductive carbon black. Among the various types of carbon blacks available, acetylene blacks and selected grades of furnace blacks produced from oil feed stocks are the types which are recognized by practitioners in rubber compounding as conductive carbon blacks. The degree of electrical conductivity of a carbon black-loaded rubber depends on a number of factors including the number of conductive paths provided by the black and the resistance of the carbon black particles. The chain structure and the level of combined oxygen present at the surface of the carbon black particles are factors that affect the conductivity of a particular type of carbon black. High chain structure, low oxygen carbon blacks are generally efficient conductors. A commonly used method of classifying the conductive character of a cured rubber composition is to measure the electrical resistivity (ohms-cm) of the rubber composition. For the purposes of this invention, a carbon black is considered conductive if it exhibits electrical resistivity of less than $10^6$ ohms-centimeter when incorporated in the rubber at the desired level with all other compound ingredients. Currently available carbon blacks which exhibit such resistivity include acetylene blacks available from Chevron Chemical Company and Denka, conductive furnace blacks available from Cabot Corporation, ketjen black available from Akzo. The most preferred carbon black is the Ketjenblack™ EC-300J from Akzo. These carbon blacks exhibit an iodine adsorption of 790 g/kg and a dibutylphthlate (DBP) absorption range of about 327.5 cc/100 g. The conductive carbon black may be added at levels of from about 10 to about 120 parts by weight per 100 parts by weight of the rubber polymer.

A conventional acid acceptor is preferably present in the ACSM containing compound. Acid acceptors are known to improve the heat resistance of the rubber. Representative acid acceptors include pentaerythritol, magnesium oxide, litharge (PbO), red lead ($Pb_3O_4$), dythal (dibasic lead phthalate), trimal (tribasic lead maleate), epoxy resins, epoxidized oils, calcium hydroxide ($Ca(OH_2)$), calcium aluminate hexahydrate, magnesium hydratalate, a magnesium oxide-aluminum oxide solid solution and mixtures thereof. The magnesium oxide-aluminum oxide solid solution is generally represented by $Mg_{0.7}Al_{0.3}O_{1.15}$. Representative of suitable magnesium oxide-aluminum oxide solid solutions are KW-2000 and KW-2100, both commercially available from Kyowa Kagaku Kogyo Co, Ltd, and the like.

The acid acceptor is present in an amount effective to remove sufficient amounts of the hydrogen chloride generated during crosslinking of the ACSM. The amount of the acid acceptor that is utilized ranges from about 1 to about 50, preferably about 4 to about 20, parts by weight (pts wt) to 100 parts by weight of alkylated chlorosulfonated polyethylene.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts. Typical amounts of reinforcing (nonconductive) type carbon blacks(s), for this invention, when used, range from about 5 to 200 phr. Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, napthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline waxes are used. Typical amounts of plasticizer, if used, comprise from 1 to 100 phr. Representative examples of such plasticizers include dioctyl sebacate, naphthenic oils, paraffinic oils, chlorinated paraffins, and the like.

Various non-carbon black fillers and/or reinforcing agents may be added to increase the strength and integrity of the rubber composition for making the document feed belt of the present invention. An example of a reinforcing agent is silica. Silica may be used in the present composition in amounts from about 0 to 80 parts, and preferably about 10 to 20 parts, by weight based on 100 parts of rubber. Hydrated aluminum oxide, for example $Al_2O_3 \cdot 3H_2O$ available from the Alcoa Company under its trade designation Hydral 710, may be used as the non-carbon black filler in the composition for making the present document feed belts. About 0 to 75 parts, and preferably about 50 to 75 parts, by weight of aluminum oxide may be used per 100 parts by weight rubber.

A free radical crosslinking reaction is used to cure the ASCM containing composition in the belt. Well-known classes of peroxides that may be used include diacyl peroxides, peroxyesters, dialkyl peroxides and peroxyketals. Specific examples include dicumyl peroxide, n-butyl-4,4-di (t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3dit(t-butylperoxy) butyrate, ethyl-3,3-di(t-amylperoxy) butyrate, 2,5-dimethyl-2,5-di(t-butylperoxy) hexane, t-butyl cumyl peroxide, a,a-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is dicumyl peroxide. Typical amounts of peroxide ranges from 2 to 12 phr (based on active parts of peroxide). Preferably, the amount of peroxide ranges from 5 to 10 phr.

Crosslinking coagents may be added to the ASCM composition. Representative examples of such coagents include triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof. Typical amounts of such coagents range from 1 to 20 phr. Preferred ranges of coagents include of from 2 to 10 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the “productive” mix stage in which the mixing typically occurs at a temperature, or ultimate temperature, lower than the mix temperature(s) than the preceding non-productive mix stage(s).

Curing of the ACSM rubber composition is generally carried out at conventional temperatures ranging from about 160° C. to 190° C. Preferably, the curing is conducted at temperatures ranging from about 170° C. to 180° C.

EXAMPLE 1

Four compositions were made from the recipes illustrated in Table I. The physical properties for each composition are provided in Table II. Samples 1 and 3 are considered controls due to the absence of any ACSM. Samples 2 and 4 are considered to be representative of the present invention due to the presence of ACSM.

Compression set is commonly used as a predictive test for tension decay of a rubber compound. As shown in Table II, replacing CSM with an alkylated CSM improves compression set resistance. The presence of EPDM lessens the improvement in compression set as seen in Sample 3.

TABLE I

| | Sample 1 Control | Sample 2 | Sample 3 Control | Sample 4 |
|---|---|---|---|---|
| | Non-Productive | | | |
| CSM[1] | 100 | 0 | 60 | 0 |
| ACSM[2] | 0 | 100 | 0 | 60 |
| EPDM[3] | 0 | 0 | 40 | 40 |
| microcrystalline wax | 2 | 2 | 2 | 2 |
| polyethylene glycol | 3 | 3 | 3 | 3 |
| magnesium oxide | 10 | 10 | 10 | 10 |
| pentaerythritol | 3 | 3 | 3 | 3 |
| hydrated amorphous silica | 15 | 15 | 15 | 15 |
| carbon black[4] | 30 | 30 | 30 | 30 |
| carbon black[5] | 15 | 15 | 15 | 15 |
| dioctyl sebacate | 25 | 25 | 25 | 25 |
| | Productive | | | |
| dicumyl peroxide (60% active) | 12 | 12 | 12 | 12 |
| triallyl cyanurate | 5 | 5 | 5 | 5 |

[1]Chlorosulfonated polyethylene commercially obtained from Du Pont DOW Elastomers under the designation Hypalon ™ 40S.
[2]Commercially obtained from Du Pont DOW Elastomers under the designation ACSIUM ® HPR 6367.
[3]Commercially obtained from Du Pont DOW Elastomers under the designation Nordel ™ 1440.
[4]SRF/N762
[5]High conductivity carbon black obtained from Akzo under the designation Ketjenblack ™ EC-300J.

TABLE II

| | Ctrl Sample 1 | Sample 2 | Ctrl Sample 3 | Sample 4 |
|---|---|---|---|---|
| CSM | 100 | 0 | 60 | 0 |
| ACSM | 0 | 100 | 0 | 60 |
| EPDM | 0 | 0 | 40 | 40 |
| | Rheometer - 3.5 min/191° C. | | | |
| minimum torque (dNm) | 4.5 | 5.0 | 7.3 | 7.5 |
| t rise (min) | 0.56 | 0.48 | 0.36 | 0.34 |
| t 90 (min) | 2.39 | 2.35 | 2.20 | 2.14 |
| S 90 (dNm) | 38.2 | 42.0 | 43.7 | 44.9 |
| | Original 25'/174° C. | | | |
| Tensile Strength (MPa) | 15.9 | 13.9 | 11.8 | 11.9 |
| Elongation | 204 | 167 | 143 | 132 |
| 50% Modulus (MPa) | 2.7 | 2.5 | 2.9 | 3.3 |
| 100% Modulus (MPa) | 6.6 | 7.0 | 7.3 | 8.6 |
| Shore A Hardness | 74 | 71 | 73 | 71 |
| Die C Tear[1] (Kg/cm) | 27.5 | 27.0 | 23.9 | 23.6 |
| | Compression Set ®, 24 hr/70° C. | | | |
| % | 17.2 | 10.8 | 11.2 | 9.2 |

[1]ASTM D624
[2]ASTM D395 Method B

What is claimed is:

1. A document handling apparatus for moving documents into and out of copying position on the platen of a document copying machine, having a flexible document transport belt, the improvement which comprises making said transport belt from a composition containing an alkylated chlorosulfonated polyethylene rubber and from 10 to 120 parts by weight per 100 parts by weight of polymer of conductive carbon black.

2. The document handling apparatus of claim 1 wherein the alkylated chlorosulfonated polyethylene is blended with up to 50 percent by weight based on the total weight of rubber content in the composition of a second rubber selected from the group consisting of ethylene-alpha-olefin elastomers, chlorosulfonated polyethylene, ethylene vinyl acetate copolymer, trans polyoctenamer and mixtures thereof.

3. The document handling apparatus of claim 2 wherein said ethylene-alpha-olefin elastomeric are selected from the group consisting of ethylene propylene copolymers, ethylene octene copolymers, ethylene propylene diene terpolymers and mixtures thereof.

4. The document handling apparatus of claim 1 wherein said compositions are cured using free radical crosslinkers.

5. The document handling apparatus of claim 4 wherein said free radical crosslinkers are selected from the group consisting of dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, a,a-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof.

6. The document handling apparatus of claim 4 wherein crosslinking coagents are present and are selected from the group consisting of triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof.

7. A transport belt for use in a document handling apparatus, the improvement which comprises making said transport belt from a composition containing an alkylated chlorosulfonated polyethylene polymer and from 10 to 120 parts by weight per 100 parts by weight of polymer of conductive carbon black.

8. The transport belt of claim 7 wherein the alkylated chlorosulfonated polyethylene is blended with up to 50 percent by weight based on the total weight of rubber content in the composition of a second rubber selected from the group consisting of ethylene-alpha-olefin elastomers, chlorosulfonated polyethylene, ethylene vinyl acetate copolymer, trans polyoctenamer and mixtures thereof.

9. The transport belt of claim 8 wherein said ethylene-alpha-olefin elastomerics are selected from the group consisting of ethylene propylene copolymers, ethylene octene copolymers, ethylene propylene diene terpolymers and mixtures thereof.

10. The transport belt of claim 7 wherein said compositions are cured using free radical crosslinkers.

11. The transport belt of claim 10 wherein said free radical crosslinkers are selected from the group consisting of dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, a,a-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof.

12. The transport belt of claim 10 wherein crosslinking coagents are present and are selected from the group consisting of triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-,tri-, tetra- and penta-functional methacrylates, n,n'-m-phenylene-dimaleimide, 1,2-cis-polybutadiene and mixtures thereof.

* * * * *